No. 884,253. PATENTED APR. 7, 1908.
C. A. YOUNGMAN.
FILTER.
APPLICATION FILED JUNE 3, 1907.

2 SHEETS—SHEET 1.

WITNESSES
Geo. W. Naylor
John K. Backwood

INVENTOR
Charles A. Youngman
BY Munn & Co
ATTORNEYS

No. 884,253.
PATENTED APR. 7, 1908.
C. A. YOUNGMAN.
FILTER.
APPLICATION FILED JUNE 3, 1907.
2 SHEETS—SHEET 2.
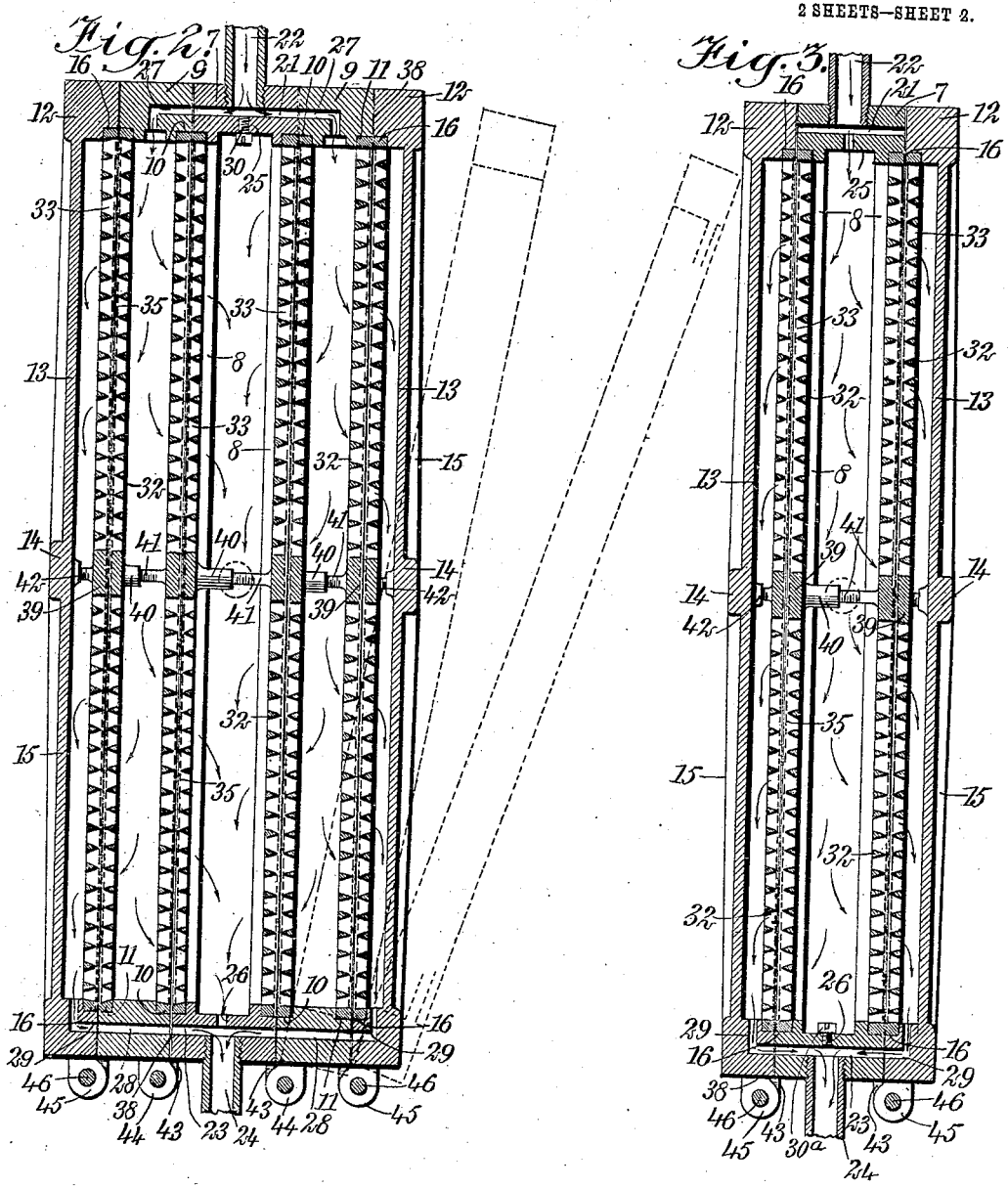
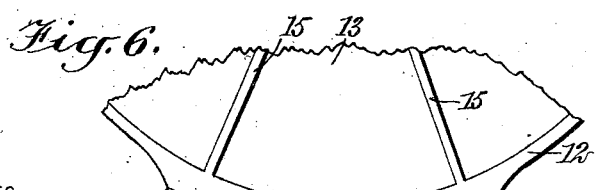
WITNESSES
INVENTOR
Charles A. Youngman.
BY Munn & Co.
ATTORNEYS

UNITED STATES PATENT OFFICE.

CHARLES ALBERT YOUNGMAN, OF LOUISVILLE, KENTUCKY, ASSIGNOR OF ONE-HALF TO ALBERT J. POHLMAN, OF LOUISVILLE, KENTUCKY.

FILTER.

No. 884,253.  Specification of Letters Patent.  Patented April 7, 1908.

Application filed June 3, 1907. Serial No. 377,083.

*To all whom it may concern:*

Be it known that I, CHARLES ALBERT YOUNGMAN, a citizen of the United States, and a resident of Louisville, in the county of Jefferson and State of Kentucky, have invented a new and Improved Filter, of which the following is a full, clear, and exact description.

This invention relates to filters, and more particularly that class of filters for clarifying turbid liquids such as distilled spirits, fermented liquors, and impure water.

The object of the invention is to provide a simple, strong and durable filter having means for supporting the sheets of filtering material whereby the filter sheets are carried by the supporting members at knife edges of the latter.

A further object of the invention is to provide a filter having a casing comprising removable members, and filtering material supports within said members, dividing the filter into chambers so arranged that the liquid to be filtered can pass from one chamber to another chamber through the filtering material only.

A still further object of the invention is to provide a filter having a casing providing removable members so constructed that by removing certain of the members the filter is changed from a quadruple to a double filter.

The invention consists in the construction and combination of parts to be more fully described hereinafter and particularly set forth in the claims.

Figure 1:
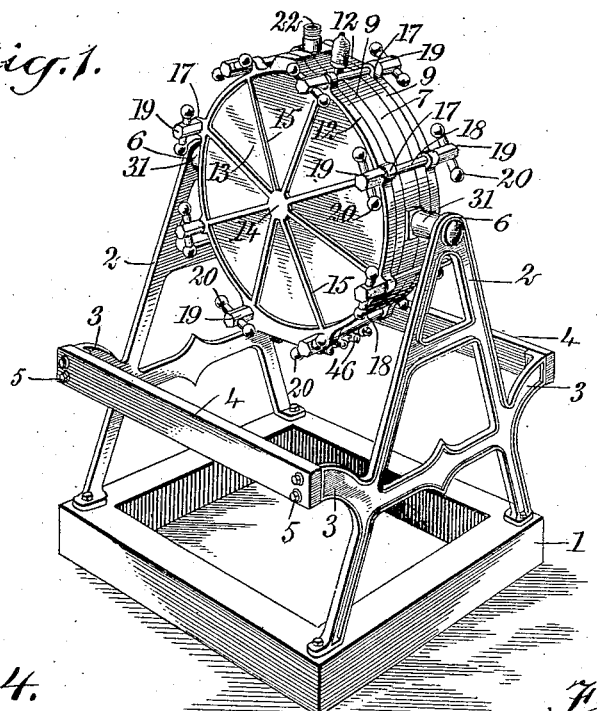
Figure 4:
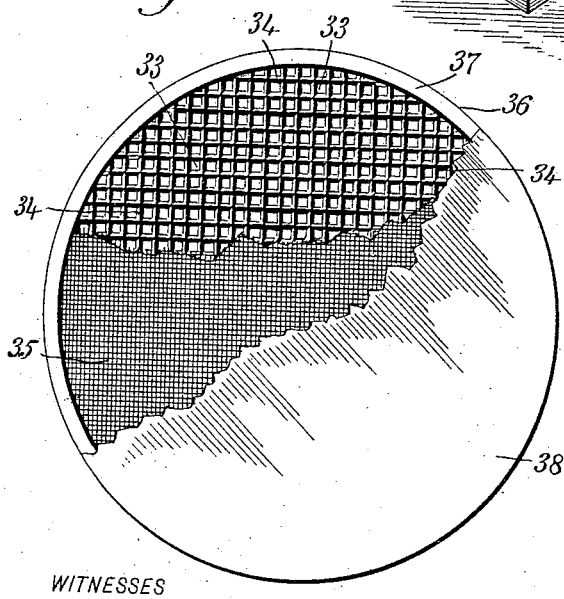
Figure 5:
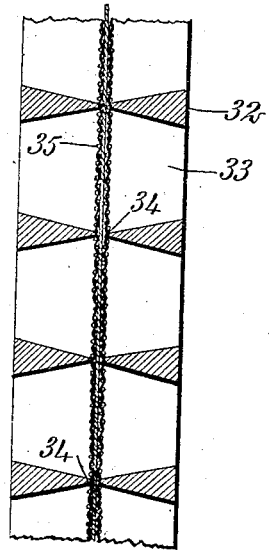

Reference is to be had to the accompanying drawings forming a part of the specification, in which similar characters of reference indicate corresponding parts in all the views, and in which Figure 1 is a perspective view of my invention; Fig. 2 is a vertical cross section of the filter showing certain parts in different positions in dotted outline; Fig. 3 is a vertical cross section showing a filter with parts of the casing removed to adapt the apparatus for use as a single filter; Fig. 4 is an elevation of a filtering material support showing parts broken away; Fig. 5 is an enlarged vertical cross section showing a part of a filtering material support; and Fig. 6 is an elevation of a detail of the invention.

Before proceeding to a more detailed explanation of my invention, it should be understood that the filter can be constructed of any suitable and strong metal that is not acted upon by the liquid to be filtered, preferably copper or brass block, tin-lined. In filtering turbid liquids such as distilled spirits, fermented liquors, water, and chemical solutions, it is customary to employ a filtering material such as filter paper and the like. The filter paper or fabric is generally employed in the form of sheets arranged upon suitable supports provided with perforations to enable the liquid to pass through each support. In my filter I employ perforated supports presenting knife edges at the side adjacent to the filtering material, and arranged between the filtering material and the support I provide a layer of netting of wire or other similar suitable material, more thoroughly to support the filter sheet against the pressure of the liquid passing through the filter. In thus employing knife edges in the support, practically the entire surface of the filter sheet is available for the passage of the liquid.

The filter comprises a casing consisting of removable sections with passages communicating with the inlet and outlet respectively, so that the liquid entering the filter flows into certain chambers and through the filtering material into other chambers, from which it escapes through other passages in the casing members to the outlet. The arrangement of the casing members and the passages is such, that when all the casing members are in position the liquid flows into certain chambers within the casing and then in both directions into the adjacent chambers, and from the latter to the outlet.

Certain of the casing members may be removed and the arrangement then becomes such that the liquid flows from the inlet into a central chamber, then through a single filtering sheet only, at each side of the central chamber to the adjacent chambers and from the latter to the outlet. In the first case the entering liquid flows into two chambers and from the latter into three adjacent chambers; whereas, in the second case the entering liquid flows into a single chamber only, and thence into two adjacent chambers. It will be understood that in the first case a greater quantity of the liquid can be filtered in a certain period of time than in the second case in a period of the same duration.

Referring more particularly to the drawings, 1 represents a support upon which are rigidly mounted opposite standards or uprights 2. The standards 2 at the sides have extensions 3 carrying cross bars 4 secured in position by means of bolts 5, and joining the standards. At the upper ends, the standards have bearings 6 for a purpose which will appear hereinafter. The filter proper, comprises a central annular casing member 7 having at the inside annular flanges 8 arranged inwardly from the edges of the member, thereby forming a recess at the inner edges. Arranged at each side of the central casing member are intermediate casing members 9 of annular form and the same diameter as the casing member 7. The casing members 9 have recesses 10 at the inner edges adjacent to the casing member 7 and corresponding in form to the recess formed at the edge of the latter. The casing members 9 have similar recesses 11 at the outer edges. I provide annular outer casing members 12 having integral webs 13 near the outer edges which form the ends of the filter. The webs 13 have strengthening boxes 14 and ribs 15 integral therewith. At the inner edges, the outer casing members 12 have recesses 16 similar to the recesses 11 of the intermediate casing members 9. It will be understood that the edges of the casing members are annular in form and extend all the way around the inner sides of the members. The outer casing members 12 have lugs 17 provided with openings therethrough in which are arranged bolts 18 having the ends extending beyond the lugs and suitably threaded to receive lock nuts 19. The lock nuts have handles 20 by means of which they can be manually operated without difficulty. When the filter is assembled, the casing members are held in position by means of the bolts 18 and lock nuts which serve to jam the casing members tightly together. The central casing member 7 has at one side a transverse passage 21 therethrough communicating with a suitable inlet 22. A similar transverse passage 23 at the opposite or lower side of the casing member 7 communicates with a suitable outlet 24. The passages 21 and 23 communicate through threaded openings 25 and 26 with the interior of the annular member 7. Adjacent to the passage 21 and registering therewith the casing members 9 have passages 27 communicating with the interior of the members 9. It will be understood that the liquid to be filtered can thus pass from the inlet 22 through the passages 21 and 27 into the interior of the filter. The casing members 9 adjacent to the passage 23 have transverse passages 28 registering with the passage 23 and effecting communication between the latter and passages 29 in the outer casing members 12, the latter discharging at the inside of the outer casing members 12, and the liquid to be filtered can thus flow from within the outer casing members through the passages 29, 28 and 23, to the outlet 24. Similarly, the liquid from within the central casing member can flow through the opening 26 to the outlet 24. A screw plug 30 removably arranged within the opening 25 prevents the flow of liquid from the passage 21 directly into the interior of the central casing member 7. At opposite sides, the central casing member 7 has projections 31 constituting pivot pins and rotatably arranged in the bearings 6 of the standards 2 to support the filter; the latter can thus be rotated into any suitable position.

I provide supporting members 32, preferably circular in shape to conform to the annular shape of the casing members. The supporting members 32 have outwardly tapering perforations 33, the partitions between the adjacent perforations being so formed that at one side the supporting members present knife edges 34. At the opposite side the partitions between the perforations are wider as is shown most clearly in Fig. 5. Stretched upon each supporting member at the side presenting the knife edge is a layer of wire netting 35 secured in position by means of a ring 36 having a flange 37 adapted to rest against the face of the supporting member at the edge thereof. Two supporting members are located in the adjacent recesses of the adjacent annular casing members, the supporting members being arranged with the knife edges contiguous. A sheet 38 of suitable filtering material is arranged between each pair of filter supports and extends laterally therebeyond between the adjacent casing members and constitutes a gasket for the latter, to prevent leakage from the filter. The filter supports, it will be understood divide the filter into chambers, one chamber lying within each annular casing member. The arrangement of the passages is such that when all the casing members are assembled as shown in Fig. 2, the liquid to be filtered enters through the inlet 22 and flows through the passages 21 and 27 into the chambers intermediate the casing members 9. From these chambers the liquid can escape through the filter supports at the side of the chambers, only, passing into the central chamber and the outer chamber. From the outer chambers the liquid passes through the passages 29, 28 and 23 to the outlet 24. From the central chamber the liquid escapes through the opening 26 to the outlet 24. Each filter support has a central boss 39. One of each pair carries at the boss an integral socket 40 having a threaded opening and the other carries a projecting threaded pin 41. The webs 13 of the outer casing members have suitably threaded sockets 42. The arrangement is such that the threaded projection 41 of a filter support engages the socket of the support at the opposite side of the chamber, or in the case of the outer chamber supports, the threaded projection engages the socket 42 of the web. By means of the sockets and the threaded projections the filter supports can be suitably spaced and adjusted, by turning the supports to screw the threaded projections further into or out of the threaded sockets.

When it is desired to use the apparatus as a double filter, the threaded plug 30 is removed and a similarly threaded plug 30ª is inserted in the opening 26 of the central casing member. When the central and the outer casing members are assembled without the intermediate casing members, the ends of the passage 21 are closed by the abutting faces of the outer members 12, so that the liquid passing through the inlet can only enter the filter through the opening 25 into the central chamber. From the central chamber the liquid passes through the filtering material to the outer chambers and then through the passages 29 and 23 to the outlet 24.

At the lower side, the central casing member has ears 43 at the opposite edges, disposed partly over the adjacent casing member; the latter has similar ears 44 at the opposite edges and extending partly over the central casing member and the outer casing member. The latter at the inner edge has ears 45 extending partly over the intermediate casing members 9. The adjacent ears have registering openings in which are located pivot pins 46, held against displacement by cotter pins 47, near the ends, the ears and the pivot pins constituting hinges, so that the casing members can be swung outwardly to permit the supporting members to be arranged in position or for any other purpose. The openings through the ears are laterally enlarged and permit the lateral expansion of the apparatus when the filtering material is inserted between the casing members. The cross bars 4 of the standards serve to hold the casing members when the filter is open.

The chambers between the filtering supports afford considerable room for the accumulation of residuum from the filtered liquids, before the apparatus is in danger of becoming clogged thereby. The accumulation of residuum in these chambers can be almost wholly removed by reversing the operation of the apparatus and flushing it with water.

Having thus described my invention, I claim as new and desire to secure by Letters Patent:—

1. In a filter, independent casing members, means for holding said members in position, filter supports arranged between adjacent casing members, and spacing means for said supports, and hinged joints connecting each adjacent pair of said casing members.

2. In a filter, independent casing members, means for removably holding said members in position, perforated filter supports arranged between adjacent casing members, adjustable spacing means for said supports, and hinged joints connecting said adjacent casing members.

3. A filter, comprising independent casing members, means for removably holding said members in position, said members having recesses at the inner edges, pairs of perforated filter supports arranged in said recesses between each adjacent pair of casing members, and a filter sheet arranged between the filter supports of each pair, and hinged joints connecting each adjacent pair of said casing members.

4. A filter, comprising independent casing members, means for removably holding said members in position, said members having recesses at the inner edges, pairs of perforated filter supports arranged in said recesses between each adjacent pair of casing members, a filter sheet arranged between the filter supports of each pair of supports, adjustable spacing means between the filter supports of adjacent pairs, said casing members being hinged together, the outer casing members having webs constituting the end walls of the filter.

5. A filter, comprising independent annular casing members, means for removably holding said members in position, said members having recesses at the inner edges, pairs of perforated filter supports arranged in said recesses between each adjacent pair of casing members and presenting knife edges at the inner sides, a filter sheet arranged between the filter supports of each adjacent pair, spacing means for said supports of adjacent pairs, and an inlet and an outlet at one of said casing members, the outer casing members having webs constituting the end walls of the filter, said casing members having ears, said ears of adjacent casing members having hinged connection.

6. In a filter, independent casing members, means for removably holding said members in position, pairs of filter supports arranged between adjacent casing members, and a filter sheet between the filter supports of each pair, said filter sheets extending beyond said supports between said casing members and constituting gaskets, adjustable spacing means for said supports, and hinged joints connecting the casing members of each adjacent pair.

7. In a filter, independent casing members, means for removably holding said members in position, said members having recesses at the inner edges, pairs of perforated filter supports arranged in said recesses between each adjacent pair of casing members, and a filter sheet arranged between the filter supports of each pair and extending therebeyond between said casing members to constitute a gasket, adjustable spacing means for said supports, and hinged joints connecting the casing members of each adjacent pair.

8. In a filter, independent casing members, filter supports arranged between adjacent casing members, and means for removably holding said casing members in position, said casing members having ears extending partly over the adjacent casing members and having laterally extended openings registering with similar openings of ears of adjacent casing members, said ears having hinge pins arranged in said openings.

9. A filter, having an inlet and an outlet, and comprising independent casing members removably held together, and filter supports having filter sheets and arranged between adjacent pairs of said casing members, said supports dividing said filter interiorly into chambers, said casing members having passages connecting one of said chambers with the inlet and another of said chambers with the outlet, adjustable spacing means for said supports, and hinged joints connecting the casing members of each adjacent pair.

10. A filter, having an inlet and an outlet, and comprising independent casing members removably held together, and filter supports having filter sheets and arranged between adjacent casing members to divide the filter into chambers, one within each casing member, one of said casing members having independent passages communicating respectively with the inlet and the outlet, said passages communicating with the chamber within said casing member, removable means for cutting off communication between said passages and said chamber within said casing member, said inlet passages communicating with passages of adjacent casing members discharging at the chambers within said adjacent casing members, said outlet passage communicating with passages of casing members beyond said adjacent casing members, and discharging at the chambers within said remote casing members.

11. A filter, having an inlet and an outlet, and comprising independent casing members removably held together, and filter supports having filter sheets and arranged between adjacent members to divide the filter into chambers, the central one of said casing members having passages communicating respectively, with the inlet and the outlet and having openings communicating with one of said chambers, removable means for closing said openings, said inlet passage communicating with passages of adjacent casing members discharging at adjacent chambers, said outlet passage communicating with transverse passages of said adjacent casing members, said transverse passages of said adjacent casing member communicating with passages of the outer casing members discharging at the chambers adjacent to said outer casing members.

12. A filter, having an inlet and an outlet, and comprising independent casing members removably held together, and filter supports having filter sheets and arranged between adjacent members to divide the filter into chambers, one within each casing member, the central one of said casing members having independent passages communicating respectively with the inlet and the outlet, and having openings communicating with the chamber within said central casing member, removable means for closing said openings, said inlet passage communicating with passages of adjacent casing members discharging at the chambers within said adjacent casing members, said outlet passage communicating with transverse passages of said adjacent casing members, said transverse passages of said adjacent casing members communicating with passages of the outer casing members discharging at the chambers through the said outer casing members.

13. A filter having an inlet and an outlet, and comprising independent annular casing members, means for removably holding said casing members in position, said casing members having hinge connections and presenting recesses at the inner adjacent edges, pairs of filter supports in the adjacent recesses of said casing members, and filter sheets arranged between the supports of each pair, said supports dividing said filter interiorly into chambers, said casing members having registering transverse passages connecting one of said chambers with the inlet, and other similar passages connecting the chambers adjacent to said chambers connected with the inlet, with the outlet.

14. In a filter, a supporting member for holding a filter sheet, having perforations therethrough, and presenting knife edges between adjacent perforations at the side adjacent to said filter sheet, the inner walls of said perforations being mutually inclined whereby at the side adjacent to said filter sheet said members present knife edges and at the opposite side the edges of said walls constitute flat surfaces.

15. In a filter, a supporting member for holding a filter sheet, having perforations therethrough, and presenting knife edges between adjacent perforations, gauze arranged upon said support at said knife edges, and a holding ring peripherally engaging at the edge of said support, having a lateral flange for securing said gauze in position.

16. In a filter, a supporting member for holding a filter sheet, having tapered perforations therethrough, and presenting knife edges at one side of said support between adjacent perforations and flat faces at the other side of said support, gauze arranged upon said support adjacent to said knife edges, and a holding ring mounted at the edge of said support and having a flange engaging said gauze to hold the same in position.

In testimony whereof I have signed my name to this specification in the presence of two subscribing witnesses.

CHARLES ALBERT YOUNGMAN.

Witnesses:
J. F. EDMISTON,
C. B. SIMOND.